April 25, 1961  A. G. MAKOWSKI  2,980,963
METHOD OF PRODUCING PLASTIC CONTAINERS
Filed March 31, 1959
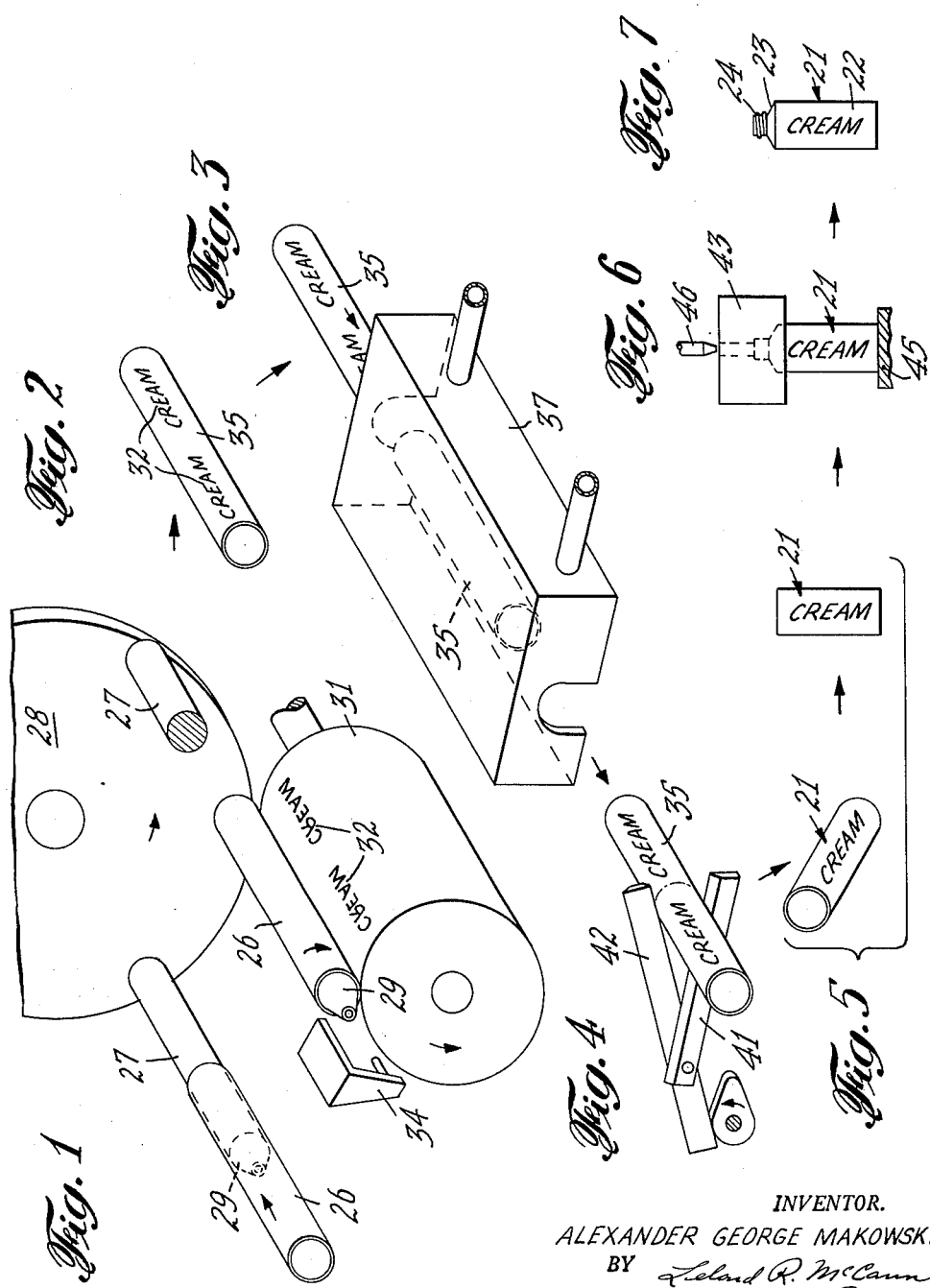
INVENTOR.
ALEXANDER GEORGE MAKOWSKI
BY
ATTORNEYS United States Patent Office 2,980,963
Patented Apr. 25, 1961

2,980,963

METHOD OF PRODUCING PLASTIC CONTAINERS

Alexander George Makowski, Fayville, Mass., assignor to American Can Company, New York, N.Y., a corporation of New Jersey Filed Mar. 31, 1959, Ser. No. 803,251

3 Claims. (Cl. 18—47.5)

The present invention relates to a method of producing tubular plastic containers and has particular reference to producing headed containers of uniform length and to printing or exteriorly decorating and drying the container bodies prior to heading.

In the manufacture of tubular plastic containers such as shaving cream tubes and the like made of polyethylene or similar plastic materials, it has been the practice to form the heads on the tubular bodies prior to any other operations such as printing, coating or sizing for length etc., because the bodies without heads are flimsy and difficult to handle and the heads tend to stiffen the bodies and hold them expanded during handling. The heads are also frequently used as handle portions to grip and handle the containers throughout the various subsequent operations.

However it has been found that printing and coating the containers which have been preheaded in this customary fashion presents several grave disadvantages. Among these disadvantages is one that stems from the fact that the head on the body makes it necessary to use a cantilever mandrel to support the container body during the usual rotary printing operation. Only one body can be printed at a time and because of the head, the head end of the mandrel cannot be supported. If printing pressure is sufficient, the mandrel is subject to flexing, being deflected thereby and this may result in a so-called corkscrewing or spiralling of the printing which would mar the overall appearance of the container.

Another important disadvantage is the fact that the printing must be followed by a drying operation. Since this is customarily effected by extended travel through a heated oven the plastic tube body which is sometimes formed by extrusion through a restricted orifice, may shrink longitudinally because of stresses built into the tube body during the extrusion process. This shrinkage is rarely uniform and results in the containers having various or non-uniform lengths which results in some cases in either insufficient marginal end portions to effect proper sealing of the containers after filling, or excessively bulky and unsightly sealed ends on some of the containers running through a sealing machine which is set for a given container height.

Various other disadvantages resulting from the head on the containers are interference in transferring the containers from one conveyor to another due to the small neck orifices, the feeding of the containers onto and from the printing mandrel and the overall handling of the containers during the various operations.

It is an object of the instant invention to overcome these disadvantages by the provision of a method of producing tubular plastic containers in a manner which permits of the effecting of the printing or decorating by rotary printing means and drying operations prior to the heading of the containers so as to produce uniform length and properly decorated containers to enhance their appearance and provide for economical and rapid production.

Another object is the provision of such a method of producing tubular plastic containers wherein a plurality of the bodies may be readily supported on a single mandrel and simultaneously printed or decorated.

Another object is to eliminate corkscrew printing of the container bodies through proper support of the mandrel.

Another object is to compensate for the shrinkage of the container bodies during the drying operation so as to provide for uniformity in the length of the bodies and thereby provide for uniform sealing areas at the sealing end of the bodies.

Another object is to provide for the easy transfer and handling of the container bodies during the various operations required to produce the containers.

Numerous other objects and advantages of the invention will be apparent as it is better understood from the following description, which, taken in connection with the accompanying drawings, discloses a preferred embodiment thereof.

Referring to the drawings:

Figure 1 is a schematic perspective view illustrating principal parts of one form of apparatus for carrying out a printing step included in the instant method invention;

Fig. 2 is a perspective view of a printed multiple container body as discharged from the apparatus shown in Fig. 1;

Fig. 3 is a schematic perspective view of one form of apparatus for effecting a drying of the printed bodies as one of the steps of the instant method invention;

Fig. 4 is a schematic perspective view of one form of apparatus for dividing a multiple length body into individual bodies;

Fig. 5 is a composite perspective and elevational view of an individual body as it is conveyed through different positions to a subsequent operation station;

Fig. 6 is a schematic elevational view of one form of apparatus for heading an individual body; and Fig. 7 is an elevational view of a finished container produced by the steps of the instant method invention.

As a preferred and exemplary embodiment of the instant method invention, the drawings illustrate schematically the various steps involved in producing a tubular plastic container 21 (Fig. 7) made of polyethylene or similar material and comprising an exteriorly printed or decorated tubular body 22 open at its lower end for filling and sealing and having at its upper end an integral cone-shaped head 23 terminating in a dispensing nozzle 24 which may or may not be exteriorly threaded for a screwcap, if desired.

In producing such a container 21, its body 22 is first formed by extruding a long tube of predetermined diameter and then cutting the tube into body lengths 26 (Fig. 1) to facilitate handling. In accordance with the instant method invention, the tube may be cut into single body lengths or multiple body lengths if desired. By way of example, the multiple body length is selected for discussion in this specification, the cut off length 26 of the tube containing two bodies, although more than two may be contained in the cut-off length if desired.

The cut off body tube 26 is placed on a cantiliver mandrel 27 (Fig. 1) preferably mounted on a rotatable disc 28. Since the body tube 26 is open at both ends it is readily pushed into place on the mandrel so that the entire length is supported on the mandrel. This permits of printing or decorating all the way to the outer edges of the tube.

In the case of prior procedures the mandrel had to be quite blunt in order to project well up into the head end of the container and support the full length of the body wall for printing. This made loading of the mandrel, whether by hand or machine, quite difficult and erratic.

According to the present invention a cone shaped nose 29 having an extended taper can be provided on the outer end of the mandrel to facilitate telescoping of the tube over the mandrel.

With the tube 26 fully supported on the mandrel 27, the disc 28 is rotated to carry the supported tube 26 into engagement with a rotatable printing or decorating roller 31 which during rotation applies a fluid substance such as ink in a printed design or other decoration 32, in this case in duplicate, onto the exterior surface of the body tube 26. Since the outer or nose end of the mandrel 27 is free during this printing operation, it is readily supported in a movable holder 34 engageable with the nose 29 of the mandrel. The holder 34 provides a rigid support for the mandrel 27 and thereby prevents its being deflected during the printing operation. This insures proper printing and overcomes any tendency to produce a corkscrew pattern as hereinbefore referred to.

Upon completion of the printing operation, the body tube 26 is stripped off the mandrel 27 as a fully printed or decorated double body tube 35 (Fig. 2) and is immediately conveyed by any suitable means to and through a conventional drying or heat treating oven 37 (Fig. 3). Passage of the printed body tube 35 through this oven dries the ink or other decorative film on the body tube to facilitate further handling. It is during its passage through this oven, that the built-in extrusion stresses in the body tube are relieved and that the shrinkage of the body tube takes place as hereinbefore mentioned.

Upon discharge from the oven 37, the printed and dried double body tube 35, is divided into the individual bodies 22. This division of the body tube 35 preferably is effected by cutting the body tube into two equal part to produce the container bodies 22. This preferably is effected by a cutting device, one form of which comprises a pair of cut-off shears 41, 42 as shown in Fig. 4.

Upon division of the body tube 35, into individual bodies 22, the bodies 22 individually, preferably are arranged into an upright position as shown in Fig. 5 and conveyed to a head injection mold 43 (Fig. 6).

At the head injection mold 43, the upper end, preferably, of the body 22 is inserted into the mold for the formation thereon of the cone-shaped head 23 (Fig. 7). Prior to the formation of the head, the body 22 is located longitudinally relative to the mold by engagement against a stop 45 disposed a predetermined distance from the bottom of the mold so that the head 23 will be formed on the body a predetermined distance from its bottom edge and thus result in the production of a container which is exactly the same length as all other containers produced in this manner. This location of the body relative to the mold compensates for the varying lengths of the bodies resulting from the shrinkage in the oven 37.

With the body 22 thus properly located in the mold 43, the head 23 is formed on the body by an injection fluid plastic material into the mold through a nozzle 46 (Fig. 6). The head 23 is thus integrally formed on the body in the correct position.

After formation of the head 23 in the above described manner, the container is discharged from the mold 43 as a finished, fully printed or decorated, headed and uniform length container 21, as shown in Fig. 7.

This completes the steps in producing the container 21.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof. In particular, while it is presently preferred to separate the multiple container bodies by cutting after the drying step, it will be understood that this separation could take place if desired by cutting against the mandrels 27 at a station following the printing station.

I claim:

1. A method of producing a plurality of decorated thermoplastic containers of substantially uniform finished length which comprises forming a plurality of finish diameter thermoplastic tubes each open at both ends by a process including an extrusion forming step whereby residual stresses remain in the tube walls rendering them subject to unpredictable axial shrinkage as a result of subsequently applied heat, placing the tubes on smooth, snugly fitting rotatable mandrels, decorating each tube by a rotary printing process wherein the mandrel backs up the tube during printing and is thus conducive to uniform imprints of high quality, removing the tubes from the mandrels and passing them through a drying zone at elevated temperature to set the imprints and incidentally cause variable axial shrinkage of the tubes due to their residual stresses, thereafter placing each tube on a snugly fitting molding mandrel with one end against a stop, and injection molding a head on each tube at a predetermined uniform distance from the stop whereby each of the completed, decorated containers has the same axial length regardless of the degree of shrinkage experienced.

2. A method of producing a plurality of decorated thermoplastic containers of substantially uniform finished length which comprises forming a plurality of finish diameter thermoplastic tubes each open at both ends by a process including an extrusion forming step whereby residual stresses remain in the tube walls rendering them subject to unpredictable axial shrinkage as a result of subsequently applied heat, placing the tubes on smooth, snugly fitting rotatable mandrels, decorating each tube with markings indicative of a plurality of body lengths by a rotary printing process wherein the mandrel backs up the tube during printing and is thus conducive to uniform imprints of high quality, removing the tubes from the mandrels, passing the tubes through a drying zone at elevated temperature to set the imprints and incidentally cause variable axial shrinkage of the tubes due to their residual stresses, cutting the tubes into body-length tubes, thereafter placing each body-length tube on a snugly fitting molding mandrel with one end against a stop, and injection molding a head on each body-length tube at a predetermined uniform distance from the stop whereby each of the completed, decorated containers has the same axial length regardless of the degree of shrinkage experienced.

3. A method as claimed in claim 1 wherein there is also included the step of supporting the said rotatable mandrels at both ends during said rotary printing to insure uniform pressure and avoid distortion and deflection of the mandrel with consequent tube displacement due to printing pressures.

References Cited in the file of this patent

UNITED STATES PATENTS

| | | |
|---|---|---|
| 2,377,532 | Waters | June 5, 1945 |

FOREIGN PATENTS

| | | |
|---|---|---|
| 314,728 | Switzerland | June 30, 1956 |